United States Patent
Yuan (10) Patent No.: US 10,501,106 B2
(45) Date of Patent: Dec. 10, 2019

(54) FOLDING MECHANISM AND STROLLER THEREOF

(71) Applicant: Wonderland Switzerland AG, Steinhausen (CH)

(72) Inventor: Jialiang Yuan, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/978,203

(22) Filed: May 14, 2018

(65) Prior Publication Data

US 2018/0327015 A1 Nov. 15, 2018

(30) Foreign Application Priority Data

May 15, 2017 (CN) .......................... 2017 1 0340098

(51) Int. Cl.
- *B62B 7/00* (2006.01)
- *B62B 7/06* (2006.01)
- *B62B 7/08* (2006.01)
- *B62B 9/24* (2006.01)

(52) U.S. Cl.
CPC .............. *B62B 7/062* (2013.01); *B62B 7/066* (2013.01); *B62B 7/08* (2013.01); *B62B 7/083* (2013.01); *B62B 9/24* (2013.01); *B62B 7/064* (2013.01); *B62B 2202/023* (2013.01); *B62B 2205/003* (2013.01); *B62B 2205/20* (2013.01)

(58) Field of Classification Search
CPC ......... B62B 7/062; B62B 7/123; B62B 7/066; B62B 7/083; B62B 7/08
See application file for complete search history.

(56) References Cited

U.S. PATENT DOCUMENTS

| 7,377,537 B2 * | 5/2008 | Li ........................... B62B 7/123 280/47.38 |
| 8,517,412 B2 * | 8/2013 | Tsai ........................ B62B 7/08 280/647 |
| 8,714,581 B2 * | 5/2014 | Fritz ....................... B62B 7/08 280/642 |
| 9,193,373 B2 * | 11/2015 | Fjelland ................... B62B 7/08 |

(Continued)

FOREIGN PATENT DOCUMENTS

CN 106043399 A 10/2016
DE 10 2015 112 332 A1 2/2017

(Continued)

*Primary Examiner* — Hau V Phan
(74) *Attorney, Agent, or Firm* — Winston Hsu (57) ABSTRACT

A folding mechanism for a stroller including a cover, a front leg connector pivoted to the cover, a rear leg connector pivoted to the front leg connector, and a front guard member pivoted to the front leg connector is disclosed. A pair of connection arms extends from the front guard member. The folding mechanism includes a rotatable member pivoted to the cover and detachably connected to the connection arm. An abutting portion protrudes from the rotatable member. When the rear leg connector is unfolding, the rear leg connector abuts against the abutting portion and drives the front guard member rotating relative to the cover to an unfolded position. When the rear leg connector is folding, the rear leg connector is detached from the abutting portion to release the front guard member to a folded position.

16 Claims, 12 Drawing Sheets

(56) References Cited

U.S. PATENT DOCUMENTS

| | | | |
|---|---|---|---|
| 9,308,929 B1* | 4/2016 | Dowd | B62B 7/062 |
| 9,725,106 B2* | 8/2017 | Pos | B62B 7/06 |
| 2009/0121455 A1 | 5/2009 | Kretschmer | |
| 2014/0008895 A1* | 1/2014 | Lee | B62B 7/062 |
| | | | 280/647 |

FOREIGN PATENT DOCUMENTS

| | | |
|---|---|---|
| EP | 2 832 624 A1 | 2/2015 |
| GB | 2503085 A | 12/2013 |

* cited by examiner

FOLDING MECHANISM AND STROLLER THEREOF

CROSS REFERENCE TO RELATED APPLICATION

This application claims the benefit of CN Application No. 201710340098.9, which was filed on May 15, 2017, and is incorporated herein by reference.

BACKGROUND OF THE INVENTION

1. Field of the Invention

The present invention relates to a folding mechanism and a stroller thereof, and more specifically, to a folding mechanism for folding a tray together with a rear leg and a stroller thereof.

2. Description of the Prior Art

In general, a conventional stroller usually has a joint folding mechanism installed thereon so that a user can operate the joint folding mechanism to unfold the stroller for use or to fold the stroller into a collapsed object for storage when there is no need to use the stroller. In the prior art, the joint folding mechanism is operated independently, is separate from a tray of the stroller, and usually has a complicated mechanical design. As such, since the tray cannot be folded together with the joint folding mechanism, the tray may interfere with the joint folding mechanism easily to cause damage of the stroller while the stroller is folded via the joint folding mechanism. Thus, folding of the stroller with the tray is not only time-consuming and strenuous (e.g. as disclosed in CN Patent No. ZL201020642520), but also causes the user much inconvenience in folding or unfolding of the stroller.

SUMMARY OF THE INVENTION

The present invention provides a folding mechanism for a stroller. The stroller includes a cover, a front leg connector, a rear leg connector, and a front guard member. The front leg connector is pivoted to the cover. The rear leg connector is pivoted to the front leg connector and collapsible relative to the front leg connector. The front guard member is pivoted to the front leg connector. A pair of connection arms extends from the front guard member. The folding mechanism includes a rotatable member. The rotatable member is pivoted to the cover and detachably connected to the connection arm. An abutting portion protrudes from the rotatable member. When the rear leg connector is unfolding, the rear leg connector abuts against the abutting portion and drives the front guard member rotating relative to the cover to an unfolded position. When the rear leg connector is folding, the rear leg connector is detached from the abutting portion to release the front guard member to a folded position.

The present invention further provides a stroller. The stroller includes a cover, a handle connector, a front leg connector, a rear leg connector, a front guard member, and a folding mechanism. The handle connector is connected to the cover. The front leg connector is pivoted to the handle connector. The rear leg connector is pivoted to the front leg connector and collapsible relative to the front leg connector. The front guard member is pivoted to the front leg connector. A pair of connection arms extends from the front guard member. The folding mechanism includes a rotatable member. The rotatable member is pivoted to the cover and detachably connected to the connection arm. An abutting portion protrudes from the rotatable member. When the rear leg connector is unfolding, the rear leg connector abuts against the abutting portion and drives the front guard member rotating relative to the cover to an unfolded position. When the rear leg connector is folding, the rear leg connector is detached from the abutting portion to release the front guard member to a folded position.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is an enlarged diagram of the rotatable member in FIG. 5a.

FIG. 7 is an enlarged diagram of a support sheet in FIG. 5a.

FIG. 9 is an enlarged diagram of a tray fixing member in FIG. 5a.

DETAILED DESCRIPTION

Detailed description for embodiments of the present invention is provided according to the following drawings, and components with similar reference characters represent component with similar structures or functions.

Figure 1:
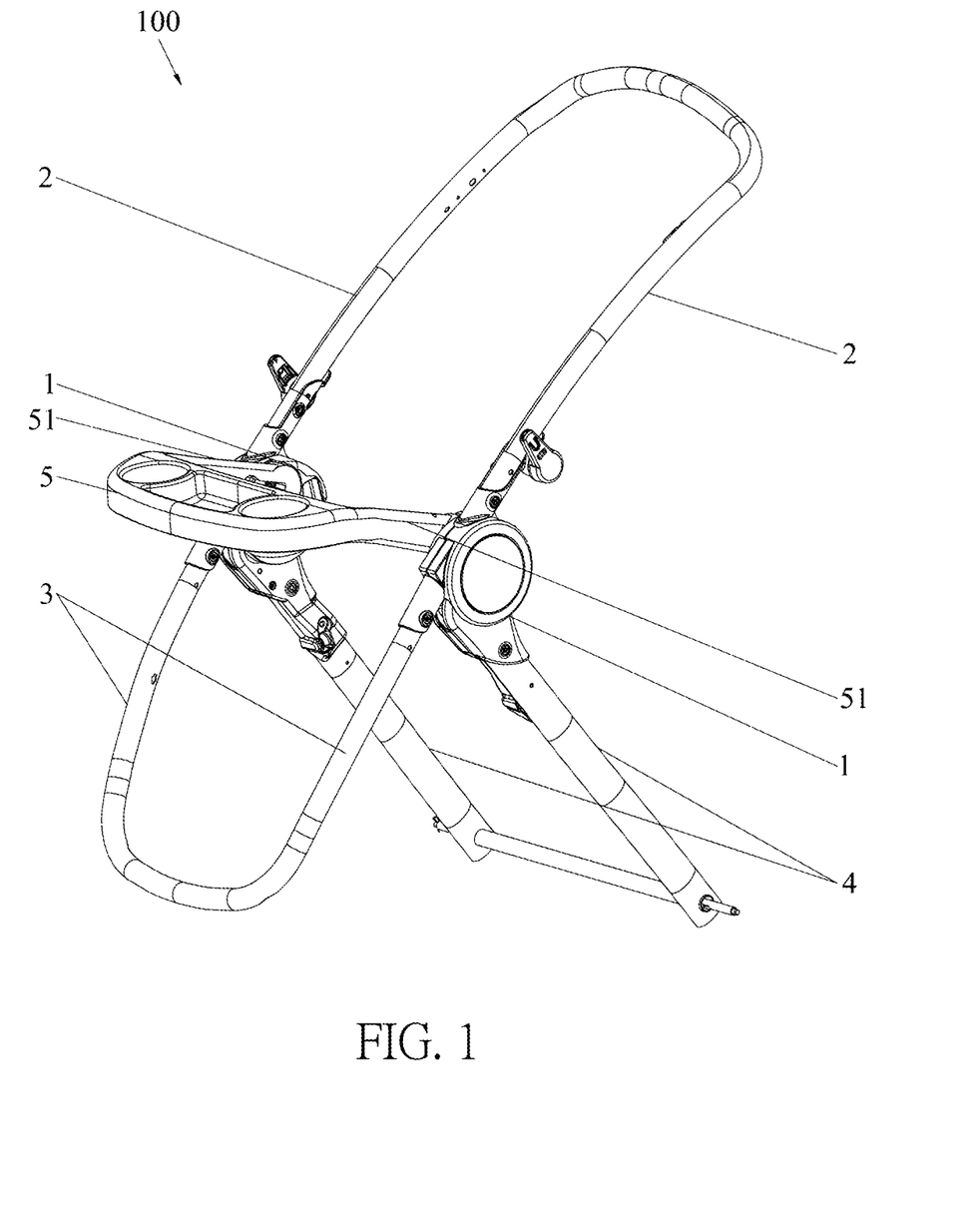
FIG. 1 is a diagram of a stroller according to an embodiment of the present invention.
Figure 2:
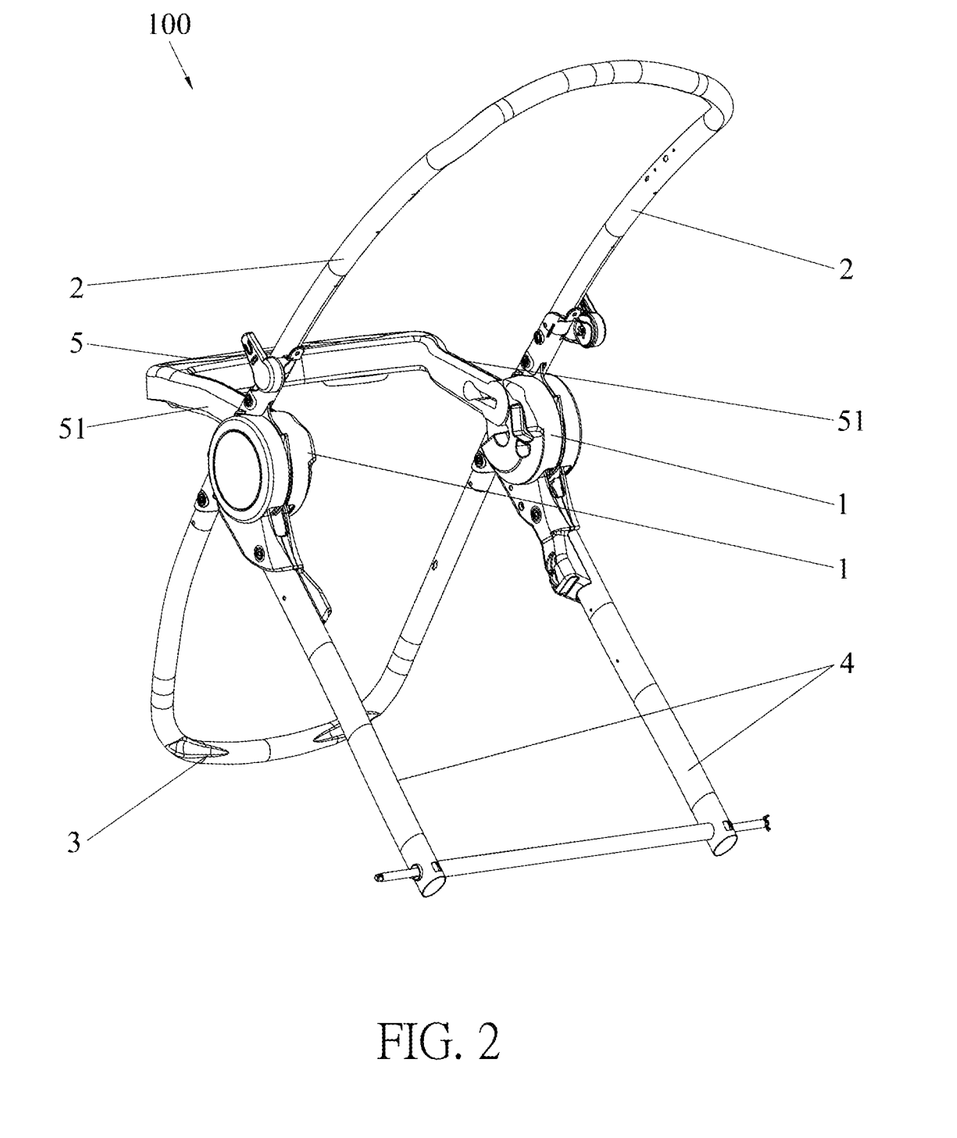
FIG. 2 is a diagram of the stroller in FIG. 1 from another viewing angle.
Figure 3:
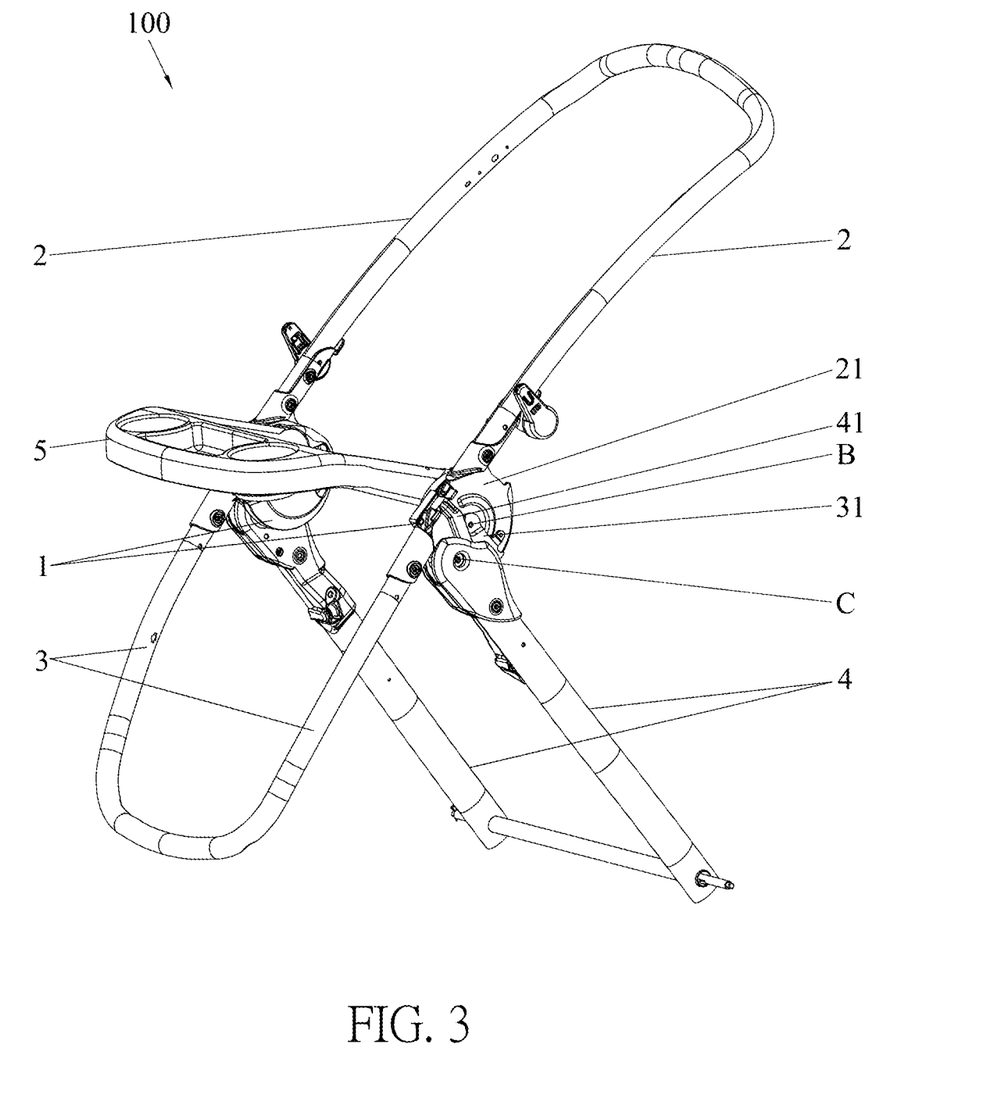
FIG. 3 is an internal diagram of a folding mechanism of the stroller in FIG. 1.

A stroller 100 provided by the present invention is described in details with reference to FIGS. 1-4 in the preferred embodiment that a front guard member of the stroller 100 is a tray 5. As shown in FIGS. 1-4, the stroller 100 includes a cover 1, a handle connector 21 connected to a handle 2, a front leg connector 31 connected to a front leg 3, a rear leg connector 41 connected to a rear leg 4, and a tray 5 pivoted to the front leg connector 31. The handle connector 21 is connected to the cover 1. The front leg connector 31 is pivoted to the handle connector 21 at "B" as shown in FIG. 3. The rear leg connector 41 is pivoted to the front leg connector 31 at "C" as shown in FIG. 3. The rear leg connector 41 can be folded or unfolded relative to the front leg connector 31 to make the rear leg 4 foldable or collapsible relative to the front leg 3. Accordingly, the stroller 100 can provide a folding function. The stroller 100 further includes a folding mechanism to make the tray 5 foldable or collapsible together with the stroller 100. More detailed description for the stroller 100 and the mechanical design of the folding mechanism is provided as follows according to FIGS. 1-9.

Figure 4:
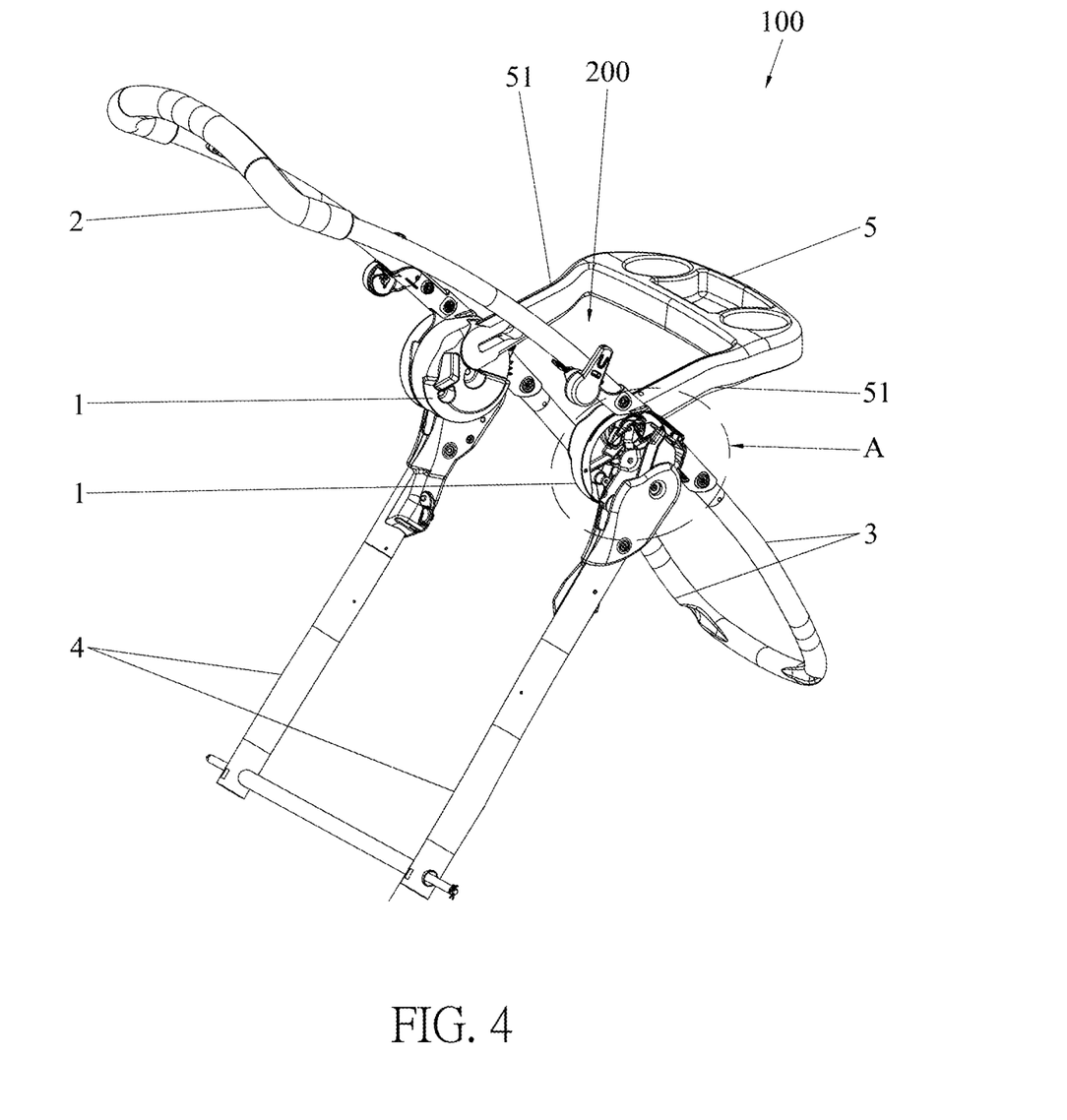
FIG. 4 is a diagram of the stroller in FIG. 3 from another viewing angle.
Figure 4A:
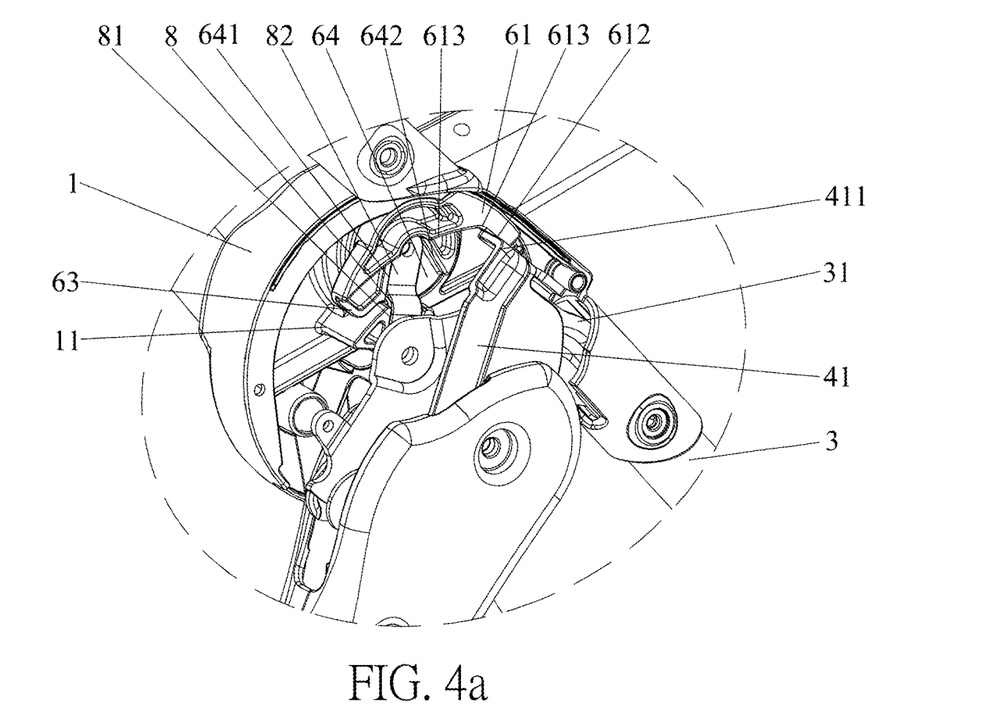
FIG. 4a is an enlarged diagram of an "A" portion of the stroller in FIG. 4.
Figure 5:
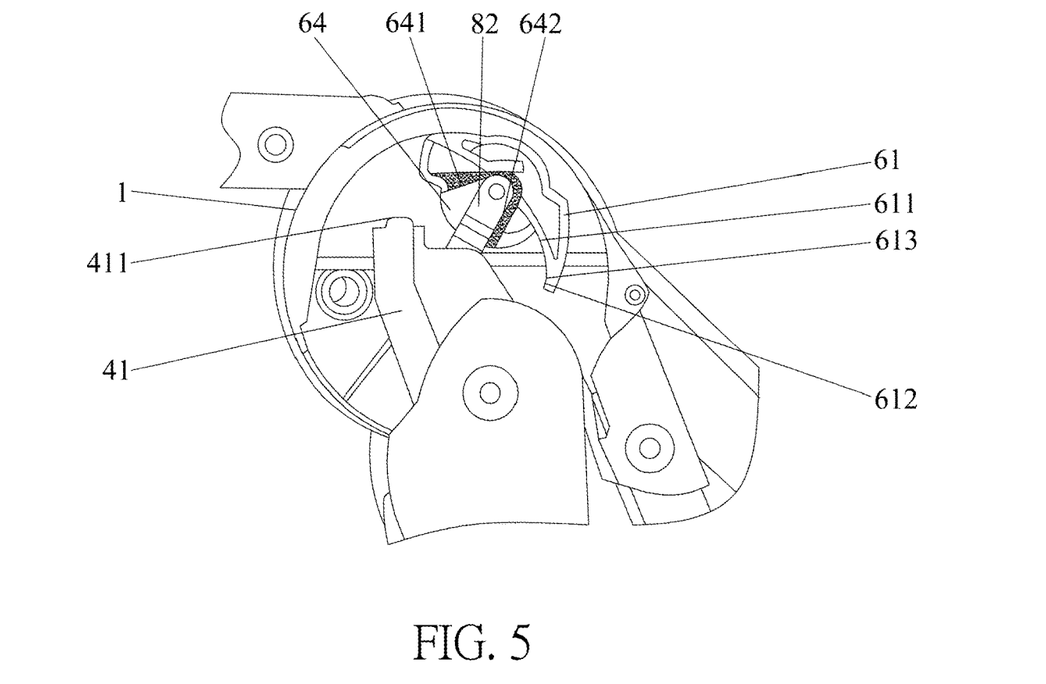
FIG. 5 is a side view of a bending portion of a rear leg connector in FIG. 4a being detached from an abutting portion of a rotatable member when a tray is folded completely.
Figure 5A:
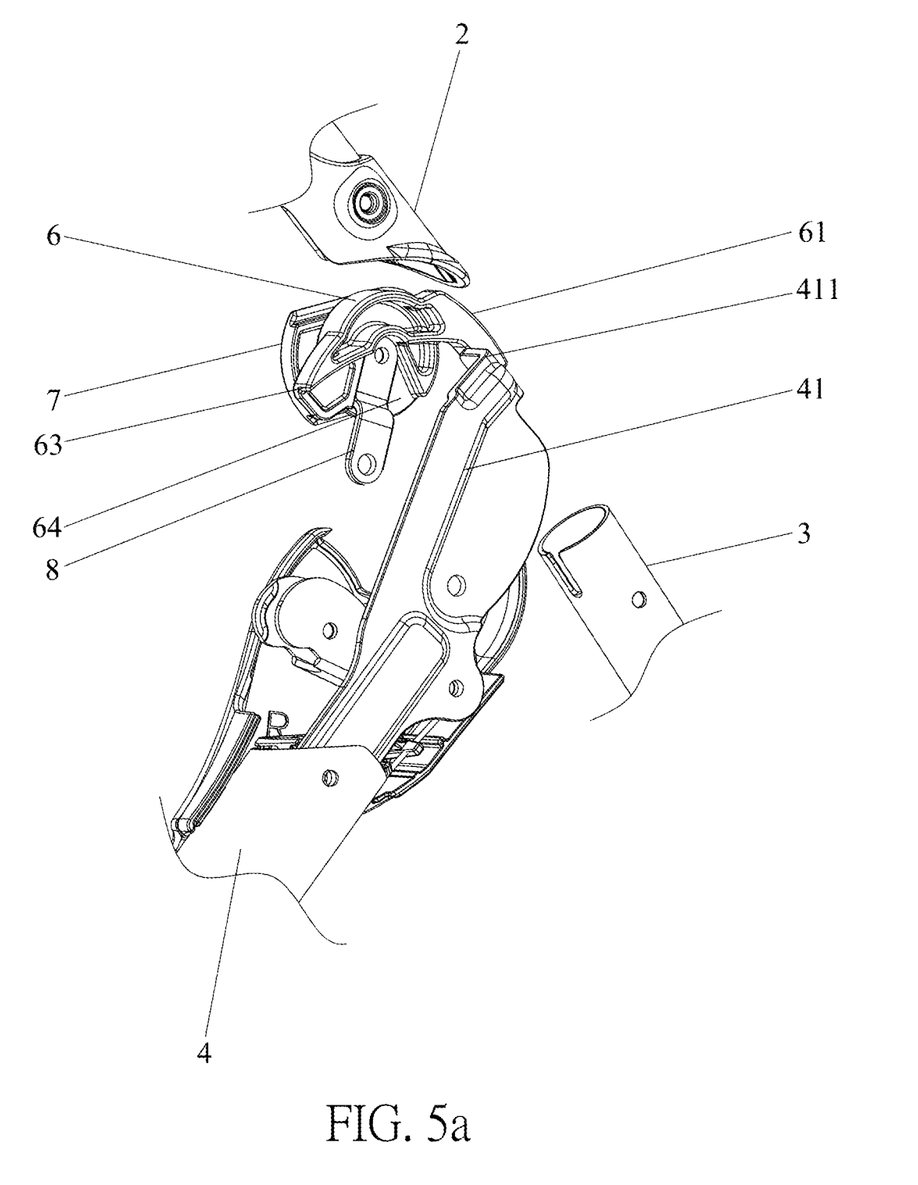
FIG. 5a is an enlarged diagram of the rear leg connector abutting against the rotatable member in FIG. 5.

As shown in FIGS. 4-5, the folding mechanism of the stroller 100 includes a rotatable member 6. More detailed description for the stroller 100 is provided as follows in the preferred embodiment that the front guide member is the tray 5. A pair of connection arms 51 extends from two ends of the tray 5. The rotatable member 6 is pivoted to the cover 1. The connection arm 51 is detachably connected to the rotatable member 6. An abutting portion 61 protrudes from the rotatable member 6. When the stroller 100 is unfolding, the rear leg 4 is unfolding relative to the front leg 3 to synchronously unfold the rear leg connector 41 relative to the front leg connector 31 to abut against the abutting portion 61 of the rotatable member 6, so as to rotate the tray 5 to an unfolded position. As such, the tray 5 can be unfolding together with the stroller 100. When the stroller 100 is folding, the rear leg 4 is folding relative to the front leg 3 to synchronously fold the rear leg connector 41 to be detached from the abutting portion 61 of the rotatable member 6 so that the tray 5 can rotate to a folded position via gravity. As such, the tray 5 can be folding together with the stroller 100.

To be more specific, since abutting of the rear leg connector 41 against the abutting portion 61 can drive the rotatable member 6 to rotate relative to the cover 1 when the stroller 100 is unfolding, the tray 5 can rotate relative to the cover 1 with rotation of the rotatable member 6. Via the aforesaid design, the tray 5 can be unfolding smoothly and conveniently when the stroller 100 is unfolding. Furthermore, since the tray 5 is supported by abutting of the abutting portion 61 against the rear leg connector 41, the tray 5 can be positioned at the unfolded position steadily. On the other hand, when the stroller 100 is folding, the rear leg connector 41 is detached from the abutting portion 61. Since the rotatable member 6 connected to the tray 5 is no longer supported by the rear leg connector 41, the tray 5 can rotate to be folding relative to the cover 1 by its weight. Via the aforesaid design, the tray 5 can be folding smoothly and conveniently when the stroller 100 is folding. In summary, the folding mechanism of the present invention has a simple mechanical design and can be unfolding or folding with the front guard member smoothly and conveniently.

As shown in FIGS. 4-9, for further improving detachable engagement of the tray 5 with the rotatable member 6, a tray fixing member 7 is disposed between the connection arm 51 and the rotatable member 6 and is pivoted to the cover 1. The tray fixing member 7 is connected to the rotatable member 6 and is detachably connected to the connection arm 51 of the tray 5. To be more specific, an engaging hole 71 is formed on the tray fixing member 7, and a protruding structure (not shown in the figures) is formed on the connection arm 51 of the tray 5 corresponding to the engaging hole 71. The protruding structure is inserted into the engaging hole 71 to make the tray 5 detachably connected to the tray fixing member 7, so as to achieve the purpose that tray 5 can be detachably connected to the rotatable member 6. In such a manner, transmission steadiness and maintenance convenience among the tray 5, the rotatable member 6 and the tray fixing member 7 can be efficiently improved.

As shown in FIGS. 4-9, the rotatable member 6 is detachably connected to the tray fixing member 7. To be specific, a convex structure 62 is inserted into the concave structure 72 to make the rotatable member 6 detachably connected to the tray fixing member 7. In one embodiment, the concave structure 72 could be formed on the tray fixing member 7, and the convex structure 62 could be formed on the rotatable member 6 for inserting into the concave structure 72. In another embodiment, the concave structure 72 could be formed on the rotatable member 6, and the convex structure 62 could be formed on the tray fixing member 7 for inserting into the concave structure 72. Via engagement of the convex structure 62 with the concave structure 72, the rotatable member 6 can be detachably connected to the tray fixing member 7 to make assembly and disassembly of the rotatable member 6 and tray 5 reliable, simple, and convenient.

As shown in FIG. 4a, the rear leg connector 41 could preferably have a bending portion 411 bending toward the rotatable member 6, so as to ensure that the rear leg connector 41 can abut against the abutting portion 61 of the rotatable member 6 when unfolding for steadily unfolding the tray 5. Accordingly, when the rear leg connector 41 is unfolding relative to the front leg connector 31, the bending portion 411 can abut against the abutting portion 61 in a surface-to-surface contact manner. On the other hand, the bending portion 411 is detached from the abutting portion 61 when the rear leg connector 41 is folding relative to the front leg connector 31.

In practical application, the abutting portion 61 could be preferably a protruding arm to increase a distance from a free end portion of the abutting portion 61 to a rotating center of the rotatable member 6 for improving a rotating torque produced by abutting of the bending portion 411 against the abutting portion 61. In such a manner, the bending portion 411 of the rear leg connector 41 can unfold the tray 5 having a heavier weight more smoothly and easily.

Figure 6:
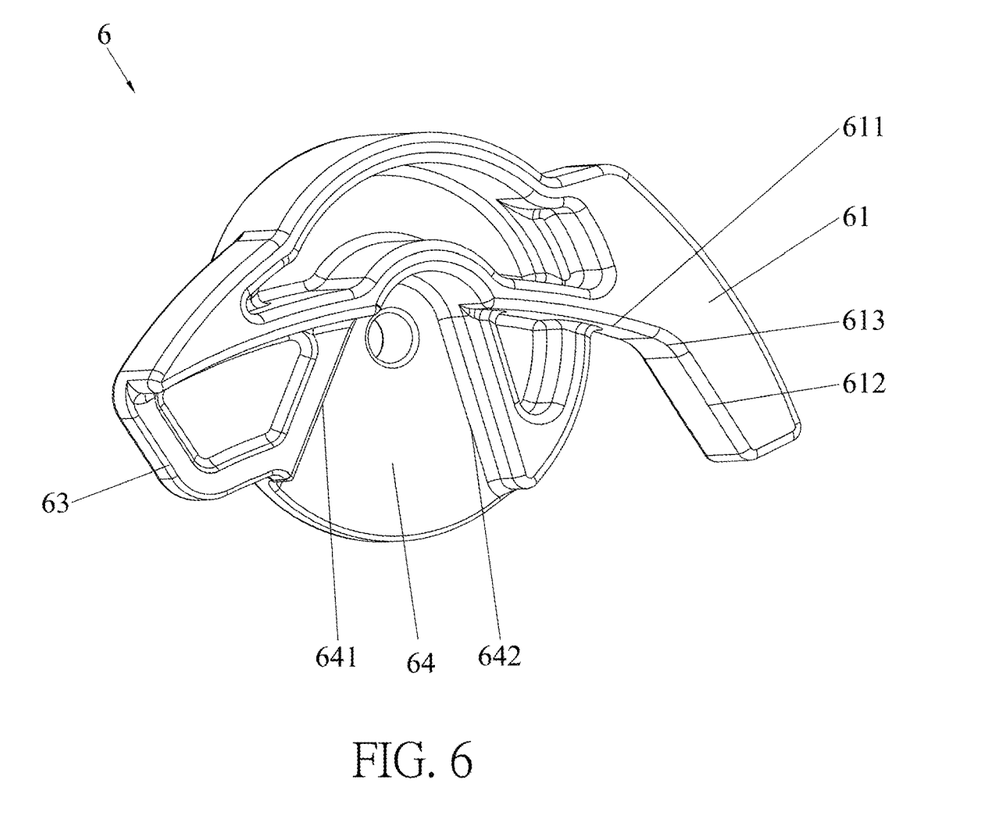
Figure 7:
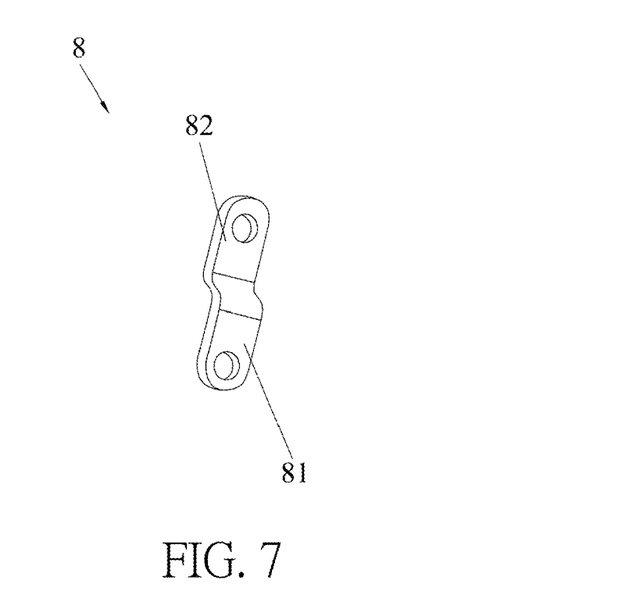
Figure 8:
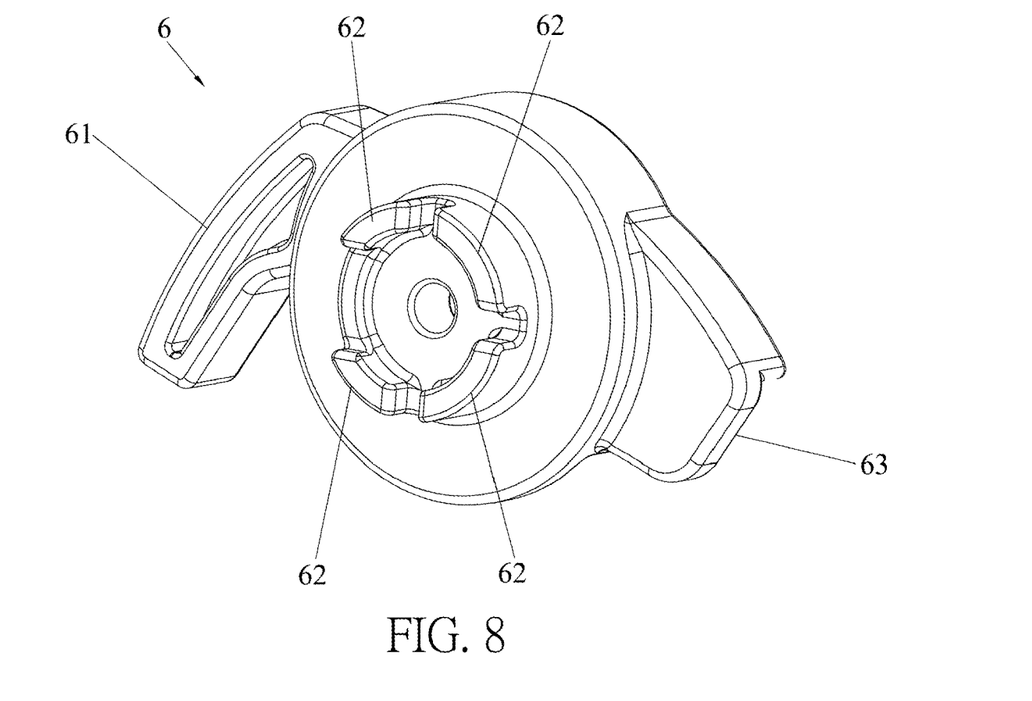
FIG. 8 is an enlarged diagram of the rotatable member in FIG. 6 from another viewing angle.
Figure 9:
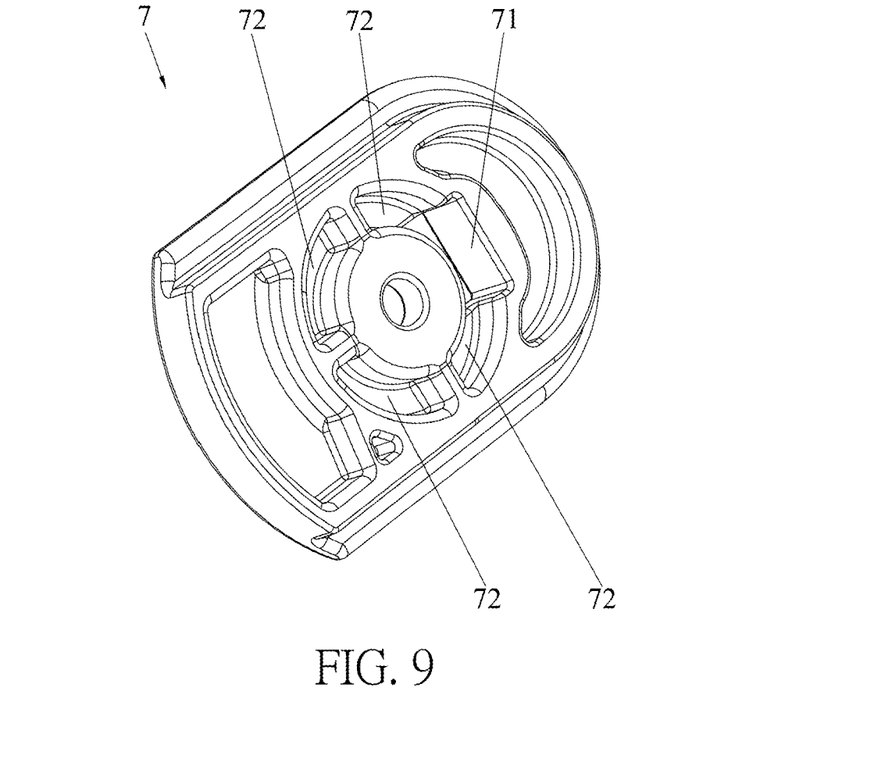

As shown in FIGS. 4-6, for further ensuring that the tray 5 can be driven to unfold smoothly and reliably by abutting of the bending portion 411 against the abutting portion 61 when the rear leg connector 41 is unfolding relative to the front leg connector 31, the abutting portion 61 could preferably have an arc-shaped surface 611. When the rear leg connector 41 is unfolding relative to the front leg connector 31, the bending portion 411 can abut against the arc-shaped surface 611 of the abutting portion 61 in a surface-to-surface contact manner. When the rear leg connector 41 is folding relative to the front leg connector 31, the bending portion 411 can be detached from the arc-shaped surface 611. Accordingly, surface-to-surface contact between the arc-shaped surface 611 and the bending portion 411 ensures unfolding steadiness and reliability of the tray 5.

A blocking surface 612 extends tangentially from a free end portion of the arc-shaped surface 611 for blocking the bending portion 411. Since the blocking surface 612 extends tangentially along the arc-shaped surface 611 (i.e. a plane where the blocking surface 612 is located is tangent to an arc corresponding to the arc-shaped surface 611), a bending structure 613 is formed at a position where the blocking surface 612 is intersected with the abutting surface 611. Accordingly, the bending structure 613 can efficiently block the bending portion 411 for preventing the tray 5 from rotating upward when an upward pulling force (e.g. the tray 5 is pulled by an upward force in an unfolding direction of the tray 5 while a baby or infant is eating his meal) is applied to the unfolded tray 5 manually. Thus, it not only ensures the unfolding steadiness of the tray 5, but also prevents objects from falling off the tray 5.

As shown in FIGS. 4-6, a limiting portion 63 protrudes from the rotatable member 6, and a protruding block 11 is formed on the cover 1 corresponding to the limiting portion 63. When the tray 5 is unfolding to the unfolded position (at this time, the rear leg 4 is unfolding completely and positioned relative to the front leg 3 for use), the protruding block 11 blocks the limiting portion 63 from rotating together with the rotatable member 6. In such a manner, the protruding block 11 can efficiently block the limiting portion 63 for preventing the tray 5 from rotating upward when an upward pulling force (e.g. the tray 5 is pulled by an upward force in an unfolding direction of the tray 5 while a baby or infant is eating his meal) is applied to the unfolded tray 5 manually. Thus, it not only ensures the unfolding steadiness of the tray 5, but also prevents objects from falling off the tray 5.

As shown in FIGS. 4-7, the folding mechanism of the present invention could further include a bending support sheet 8. The bending support sheet 8 is fixedly connected to the cover 1 at one end and pivoted to the rotatable member 6 at another end. To be more specific, the bending support sheet 8 includes a fixing portion 81 and a support portion 82. The support portion 82 bends from the fixing portion 81 toward the rotatable member 6. The fixing portion 81 is fixedly connected to the cover 1, and the support portion 82 is pivoted to the rotatable member 6.

As shown in FIGS. 4-7, a sector slot 64 could be preferably formed on the rotatable member 6, and the support portion 82 is disposed in the sector slot 64. When the tray 5 is unfolding horizontally, the support portion 82 abuts against a first inner wall 641 of the sector slot 64. When the tray 5 is folding completely, the bending support portion 82 abuts against a second inner wall 642 of the sector slot 64. As such, when the tray 5 is unfolding to use and is pulled by a force in an unfolding direction of the tray 5, the support portion 82 abuts against the first inner wall 641 for limiting the tray 5 from rotating in the unfolding direction of the tray 5, so as to ensure the unfolding steadiness of the tray 5 and further prevent objects from falling off the tray 5. On the other hand, when the tray 5 is folding completely and is pressed by a force in a folding direction of the tray 5, the support portion 82 abuts against the second inner wall 642 for limiting the tray 5 from rotating in the folding direction of the tray 5, so as to prevent the tray 5 from interfering with other mechanisms of the stroller 100.

As shown in FIGS. 1-9, the rotatable member 6 is pivoted to the cover 1, the tray 5 is detachably connected to the rotatable member 6 via the connection arm 51, the abutting portion 61 protrudes from the rotatable member 6, and the rear leg connector 41 can abut against the abutting portion 61 of the rotatable member 6 when unfolding relative to the front leg connector 31. Accordingly, when the stroller 100 is unfolding, the rotatable member 6 can be driven to rotate relative to the cover 1 by abutting of the rear leg connector 41 against the abutting portion 61, so as to rotate the tray 5 to the unfolded position. Via the aforesaid design, the tray 5 can be unfolding smoothly and conveniently during the unfolding process of the stroller 100. Furthermore, abutting of the rear leg connector 41 against the abutting portion 61 can support the tray 5 to be positioned at the unfolded position steadily. On the other hand, when the stroller 100 is folding, the rear leg connector 41 is detached from the abutting portion 61. At this time, since the rotatable member 6 connected to the tray 5 is no longer supported by the rear leg connector 41, the tray 5 can rotate to be folding relative to the cover 1 by its weight. Via the aforesaid design, the tray 5 can be folding smoothly and conveniently during the folding process of the stroller 100. In summary, the stroller 100 having the folding mechanism provided by the present invention has a simple mechanical design and can be unfolding or folding with the tray 5 smoothly and conveniently.

Figure 10:
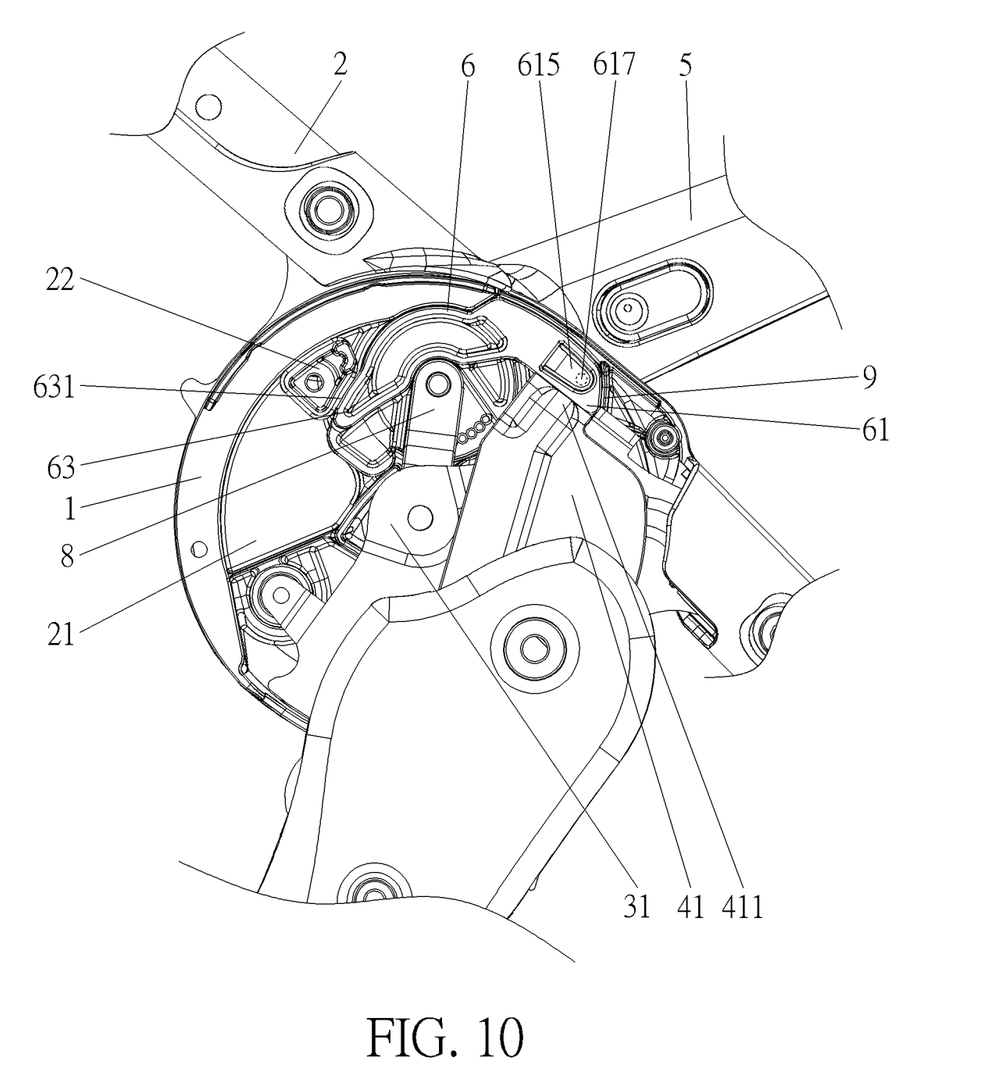
FIG. 10 is a side view of a limiting block abutting against a limiting portion of the rotatable member according to another embodiment of the present invention.
Figure 11:
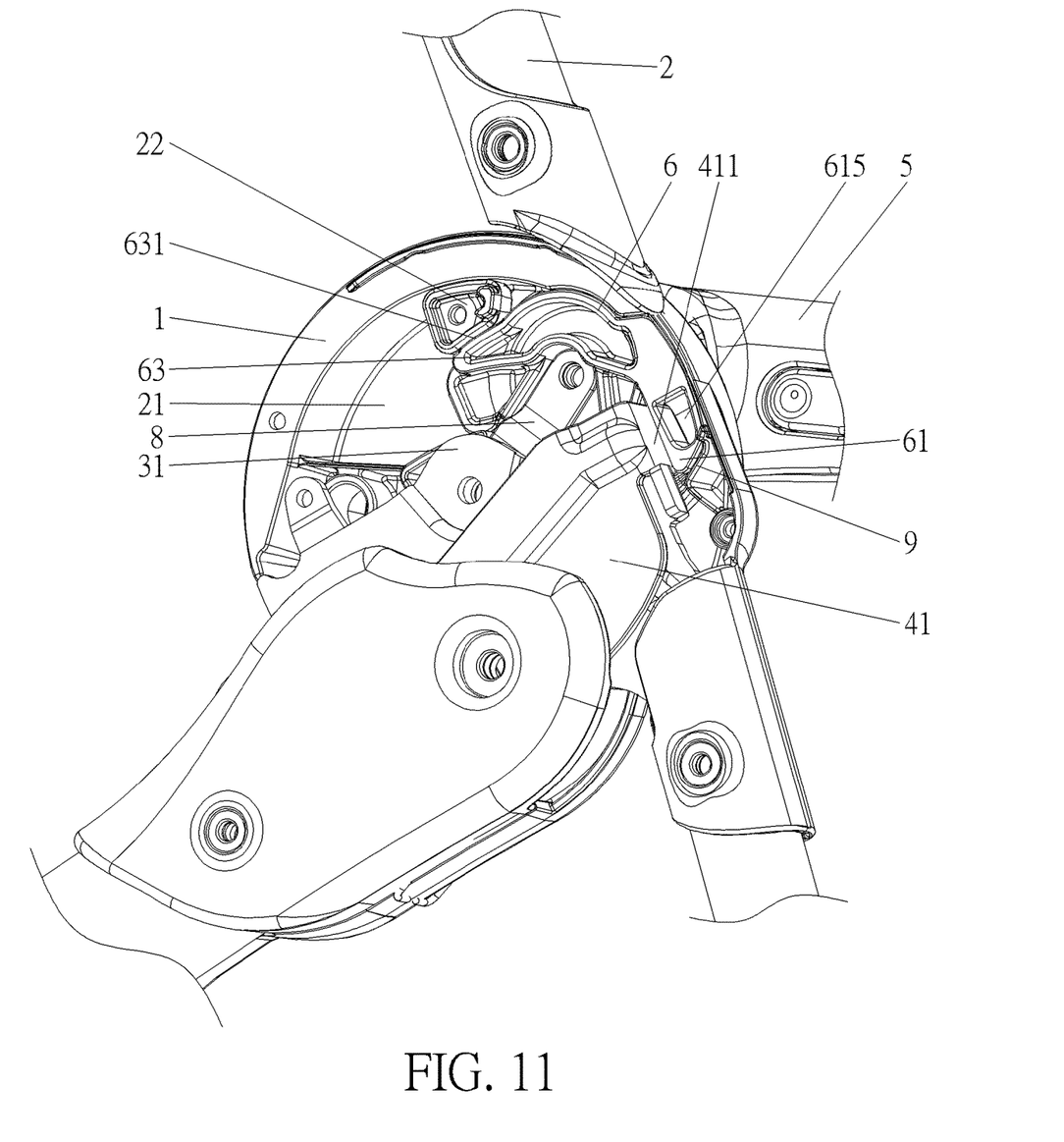
FIG. 11 is a diagram of the limiting block abutting against the limiting portion of the rotatable member in FIG. 10 from another viewing angle.
Figure 12:
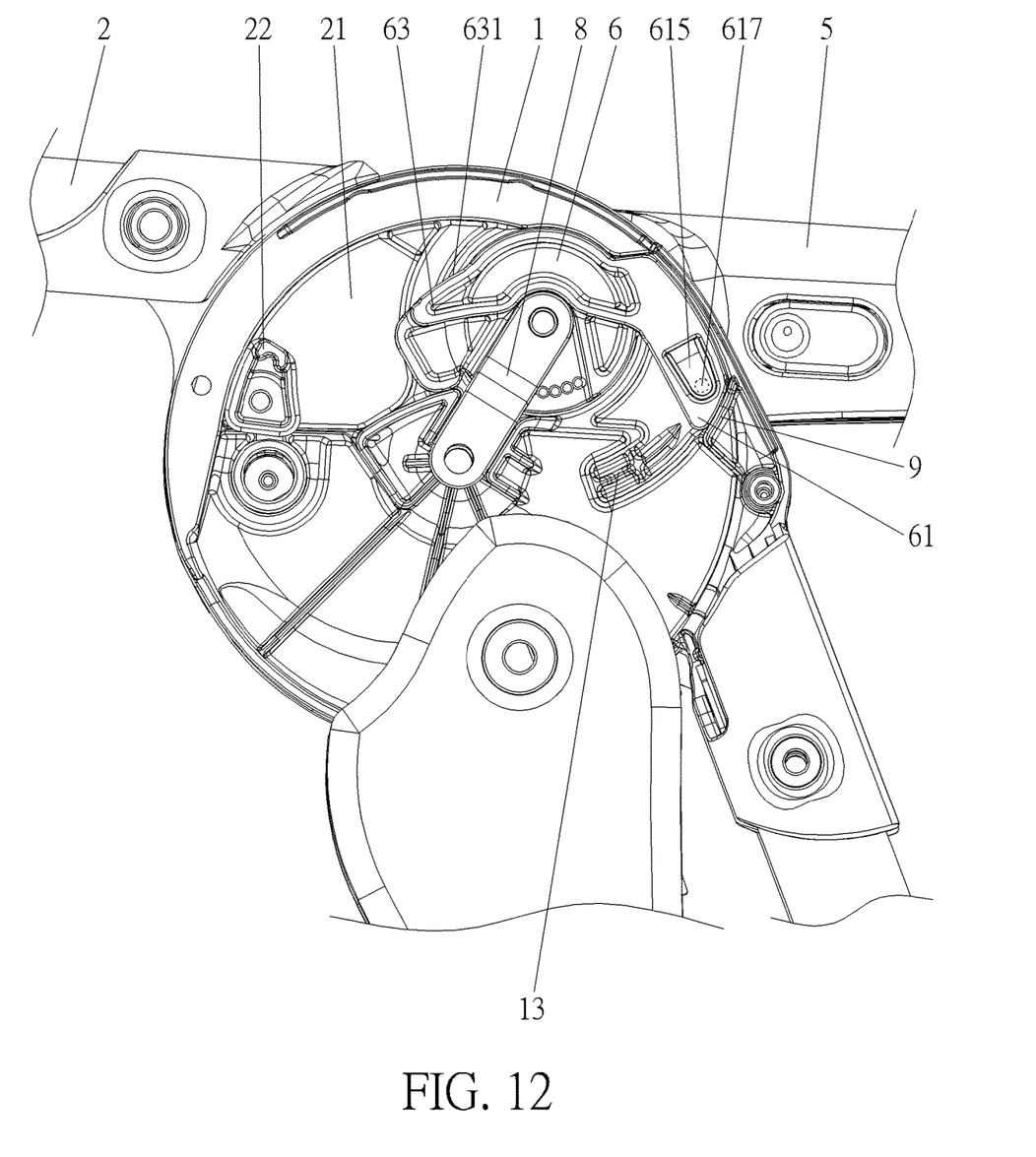
FIG. 12 is a side view of the limiting block in FIG. 10 being detached from the limiting portion of the rotatable member.

In addition, the present invention could adopt other limiting designs for further improving steadiness of the tray 5 when unfolding or folding. For example, as shown in FIGS. 10-12, the folding mechanism could further include a limiting block 22. The limiting block 22 is fixedly disposed on the handle connector 21 (e.g. by rivet). As such, the limiting block 22 can rotate with the handle connector 21 to abut against a top surface 631 of the limiting portion 63 as shown in FIG. 10 for preventing the tray 5 from wobbling, so as to make the tray 5 positioned at the unfolded position steadily. On the other hand, when the handle connector 21 is folding relative to the cover 1, the limiting block 22 can rotate with the handle connector 21 to be detached from the limiting portion 63 as shown in FIG. 12. Accordingly, since the limiting portion 63 is no longer blocked by the limiting block 22, the tray 5 can be folding together with the stroller 100.

Furthermore, as shown in FIGS. 10-12, a rib 9 could preferably protrude from the cover 1 corresponding to the abutting portion 61 of the rotatable member 6. Accordingly, when the tray 5 is unfolding to the unfolded position, the rib 9 can abut against the abutting portion 61 to constrain movement of the abutting portion 61, so as to prevent the tray 5 from rotating upward when an upward pulling force (e.g. the tray 5 is pulled by an upward force in an unfolding direction of the tray 5 while a baby or infant is eating his meal) is applied to the unfolded tray 5 manually. Thus, it not only ensures the unfolding steadiness of the tray 5, but also prevents objects from falling off the tray 5.

Figure 13:
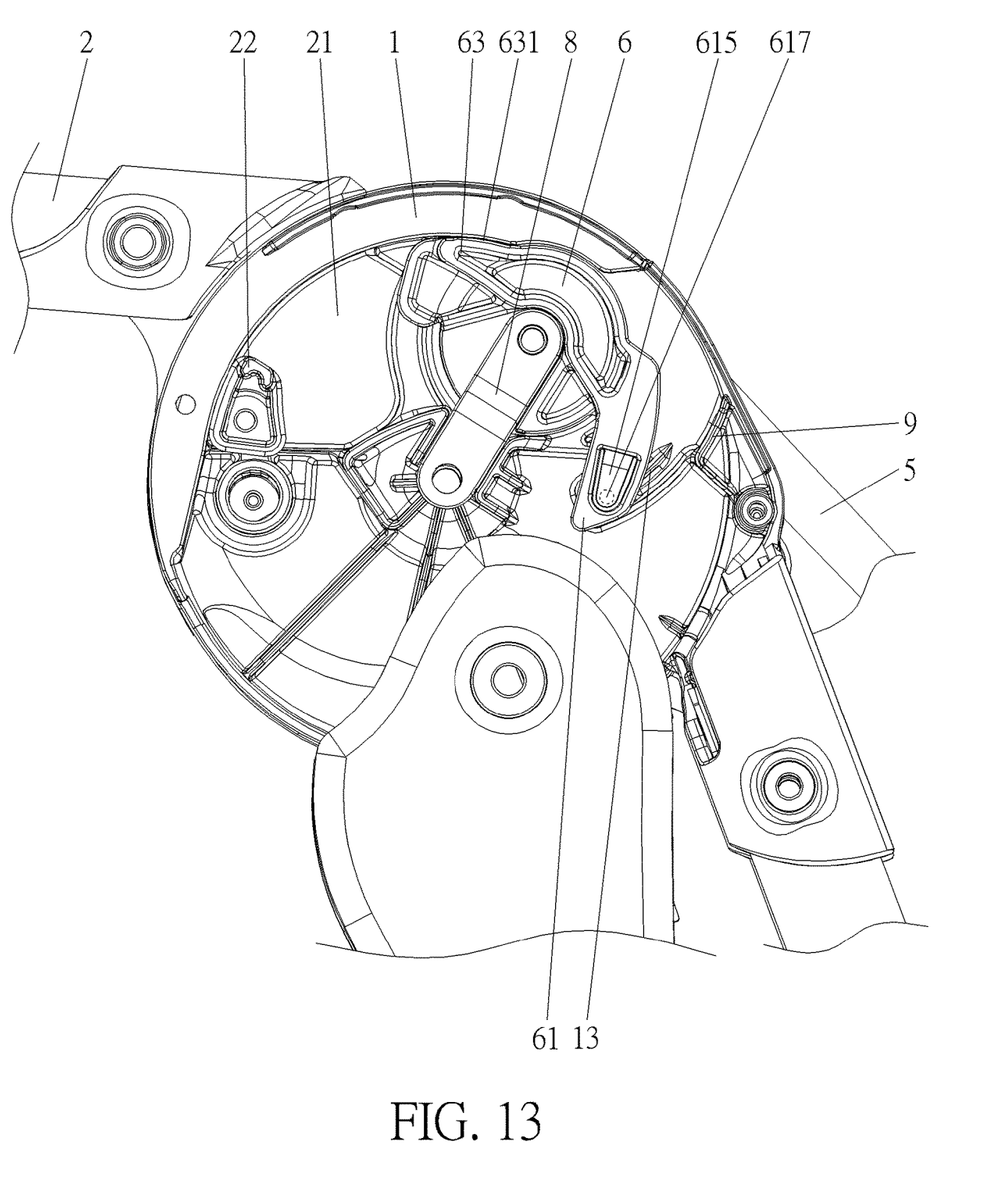
FIG. 13 is a side view of a protruding point of a resilient finger of the rotatable member in FIG. 12 being engaged with a positioning slot on a cover.

Moreover, as shown in FIGS. 12-13, a resilient finger 615 could be preferably formed on the abutting portion 61 and could include a protruding point 617 protruding toward the cover 1, and a positioning slot 13 (preferably 1 mm depth, but not limited thereto) could be formed on the cover 1 corresponding to the resilient finger 615. Accordingly, when the tray 5 rotates to the folded position as shown in FIG. 13 relative to the cover 1, the protruding point 617 is engaged with the positioning slot 13 for positioning the rotatable member 6 steadily, so as to efficiently prevent rotation of the tray 5 when the tray 5 is folding with the stroller 100.

It should be mentioned that the front guard member could be other guard structure for constraining a baby or infant on a stroller. The front guard member (i.e. the tray 5) is merely one of several guard structures in the prior art from which the skilled person would select in accordance with the aforesaid embodiments of the present invention without the exercise of inventive skill. As for the related description for the connection, folding, and unfolding designs of the other guard structures, it could be reasoned by analogy according to the aforesaid embodiments of the present invention and therefore omitted herein. Furthermore, the tray 5 or the other guard structures of the present invention could preferably form an enclosed region 200 (as shown in FIG. 4) cooperatively with a seat back of the stroller 100 to constrain a baby or infant on the stroller 100 for safety. To be noted, the detailed description for the unfolding and folding mechanical designs of the front leg 3 and the rear leg 4 of the stroller 100 provided by the present invention is well known to those skilled in the art and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A folding mechanism for a stroller, the stroller comprising a cover, a front leg connector, a rear leg connector, and a front guard member, the front leg connector being pivoted to the cover, the rear leg connector being pivoted to the front leg connector and collapsible relative to the front leg connector, the front guard member being pivoted to the front leg connector, a pair of connection arms extending from the front guard member, the folding mechanism comprising:
a rotatable member pivoted to the cover and detachably connected to the connection arm, an abutting portion protruding from the rotatable member;
wherein when the rear leg connector is unfolding, the rear leg connector abuts against the abutting portion and drives the front guard member rotating relative to the cover to an unfolded position;
when the rear leg connector is folding, the rear leg connector is detached from the abutting portion to release the front guard member to a folded position.

2. The folding mechanism of claim 1, wherein the front guard member is a tray.

3. The folding mechanism of claim 2 further comprising:
a tray fixing member pivoted to the cover and detachably connected to the connection arm.

4. The folding mechanism of claim 2 further comprising:
a tray fixing member detachably connected to the rotatable member.

5. The folding mechanism of claim 4, wherein the rotatable member and the tray fixing member are detachably connected by a convex structure and a corresponding concave structure formed on the rotatable member and the tray fixing member respectively.

6. The folding mechanism of claim 1, wherein the rear leg connector has a bending portion bending toward the rotatable member, the bending portion abuts against the abutting portion when the rear leg connector is unfolding relative to the front leg connector, and the bending portion is detached from the abutting portion when the rear leg connector is folding relative to the front leg connector.

7. The folding mechanism of claim 6, wherein the abutting portion is a protruding arm.

8. The folding mechanism of claim 7, wherein the abutting portion has an arc-shaped surface, the bending portion abuts against the arc-shaped surface when the rear leg connector is unfolding relative to the front leg connector, and the bending portion is detached from the arc-shaped surface when the rear leg connector is folding relative to the front leg connector.

9. The folding mechanism of claim 8, wherein a blocking surface extends tangentially from a free end portion of the arc-shaped surface for blocking the bending portion.

10. The folding mechanism of claim 1 further comprising:
a limiting portion protruding from the rotatable member; and
a protruding block formed on the cover;
wherein the protruding block stops the limiting portion to prevent rotation of the front guard member at the unfolded position.

11. The folding mechanism of claim 1, wherein the folding mechanism further comprises a bending support sheet and the bending support sheet is fixedly connected to the cover at one end and pivoted to the rotatable member at another end.

12. The folding mechanism of claim 11, wherein the bending support sheet comprises a fixing portion and a support portion, the support portion bends from the fixing portion toward the rotatable member, the fixing portion is fixedly connected to the cover, and the support portion is pivoted to the rotatable member.

13. The folding mechanism of claim 12, wherein a sector slot is formed on the rotatable member, the support portion is disposed in the sector slot, the support portion abuts against a first inner wall of the sector slot when the front guard member is in the unfolded position, and the support portion abuts against a second inner wall of the sector slot when the front guard member is in the folded position.

14. The folding mechanism of claim 1, wherein the folding mechanism further comprises a handle connector and a limiting block, the handle connector is pivoted to the cover, the limiting block is fixedly disposed on the handle connector, a limiting portion protrudes from the rotatable member, and the limiting block abuts against a top surface of the limiting portion for preventing rotation of the front guard member in the unfolded position.

15. The folding mechanism of claim 1, wherein the folding mechanism further comprises a rib protruding from the cover corresponding to the abutting portion of the rotatable member, and the rib abuts against the abutting portion for constraining movement of the abutting portion when the rear leg connector is unfolding.

16. The folding mechanism of claim 1, wherein the folding mechanism further comprises a resilient finger formed on the abutting portion, the resilient finger comprises a protruding point protruding toward the cover, a positioning slot formed on the cover corresponding to the resilient finger, and the protruding point is engaged with the positioning slot for positioning the rotatable member when the front guard member is in the folded position.

* * * * *